US012372428B2

United States Patent
Shen et al.

(10) Patent No.: US 12,372,428 B2
(45) Date of Patent: Jul. 29, 2025

(54) NEGATIVE PRESSURE WAVE MONITORING BASED LEAK DETECTION METHOD OF MULTIPATH PIPELINE NETWORK

(71) Applicant: TIANJIN JYJC TECHNOLOGY CO., LTD., Tianjin (CN)

(72) Inventors: Jingtuo Shen, Tianjin (CN); Chao Gao, Tianjin (CN); Yongfang He, Tianjin (CN); Peng Wang, Tianjin (CN); Hugejile Liang, Tianjin (CN); Quan Wan, Tianjin (CN); Xianzhi Lang, Tianjin (CN); Yang Yang, Tianjin (CN); Lingda Gao, Tianjin (CN)

(73) Assignee: TIANJIN JYJC TECHNOLOGY CO., LTD., Tianjin (CN)

( * ) Notice: Subject to any disclaimer, the term of this patent is extended or adjusted under 35 U.S.C. 154(b) by 376 days.

(21) Appl. No.: 17/958,884

(22) Filed: Oct. 3, 2022

(65) Prior Publication Data

US 2023/0408364 A1     Dec. 21, 2023

(30) Foreign Application Priority Data

Jun. 20, 2022   (CN) .......................... 202210695634.8

(51) Int. Cl.
*G01M 3/28*     (2006.01)
*F17D 5/02*     (2006.01)
(Continued)

(52) U.S. Cl.
CPC ............. *G01M 3/2815* (2013.01); *G01F 1/37* (2013.01); *F17D 5/02* (2013.01); *F17D 5/06* (2013.01);
(Continued)

(58) Field of Classification Search
CPC .... G01M 3/2815; G01M 3/243; G01M 3/007; G01M 3/26; G01M 3/28; G01F 1/37;
(Continued)

(56) References Cited

U.S. PATENT DOCUMENTS

2015/0308919 A1* 10/2015 Zhang ................... G01M 3/243
                                                            702/51

FOREIGN PATENT DOCUMENTS

CN     103234121 A   *  8/2013
CN     103216731 B   *  2/2015
(Continued)

OTHER PUBLICATIONS

Li et al. ("Pipeline leakage monitor system based on Virtual Instrument," 2009 International Conference on Mechatronics and Automation, Changchun, 2009, pp. 5105-5110, doi: 10.1109/ICMA.2009.5246155.) (Year: 2017).*
(Continued)

*Primary Examiner* — Lisa M Caputo
*Assistant Examiner* — Christian T Bryant (57) ABSTRACT

The present invention discloses a negative pressure wave monitoring based leak detection method of a multipath pipeline network, including: analyzing a propagation process of a negative pressure wave in a single straight pipeline to obtain a calculated result of a sound velocity in a thin-walled pipe marking the pressure sensors at known disposing positions on a pipeline network map; linearly interpolating position coordinates of key nodes in the pipeline network to extend pipeline network information; resolving the time that a negative pressure wave signal generated by a leak propagates to each disposed RTUs to form a data column; and simulating a leak situation, detecting a pipeline pressure waveform by using the RTUs in a current network, and determining a point corresponding to the data column
(Continued)

closest to a measured propagation time delay in the time delay standard library as a leak point, and outputting the position of the leak point.

6 Claims, 6 Drawing Sheets

(51) Int. Cl.
- *F17D 5/06* (2006.01)
- *G01F 1/37* (2006.01)
- *G01F 22/02* (2006.01)
- *G01M 3/26* (2006.01)
- *G01M 3/00* (2006.01)
- *G01M 3/24* (2006.01)

(52) U.S. Cl.
CPC ............. *G01F 22/02* (2013.01); *G01M 3/007* (2013.01); *G01M 3/243* (2013.01); *G01M 3/26* (2013.01); *G01M 3/28* (2013.01); *Y02A 20/15* (2018.01)

(58) Field of Classification Search
CPC . G01F 22/02; Y02A 20/15; F17D 5/06; F17D 5/02
See application file for complete search history.

(56) References Cited

FOREIGN PATENT DOCUMENTS

| CN | 107620868 A | * | 1/2018 | |
|----|-------------|---|--------|----------|
| CN | 109681787 A | * | 4/2019 | F17D 5/02 |
| CN | 111853552 B | * | 3/2021 | |

OTHER PUBLICATIONS

Wang et al. ("Pipeline Leak Detection by Using Time-Domain Statistical Features," in IEEE Sensors Journal, vol. 17, No. 19, pp. 6431-6442, 1 Oct. 1, 2017, doi: 10.1109/JSEN.2017.2740220.) (Year: 2017).*

* cited by examiner

NEGATIVE PRESSURE WAVE MONITORING BASED LEAK DETECTION METHOD OF MULTIPATH PIPELINE NETWORK

CROSS-REFERENCE TO RELATED APPLICATION

This application claims priority from the Chinese patent application 2022106956348 filed Jun. 20, 2022, the content of which are incorporated herein in the entirety by reference.

TECHNICAL FIELD

The present disclosure relates to the field of multipath pipeline network leak detection, in particular to a negative pressure wave monitoring based leak detection method of a multipath pipeline network.

BACKGROUND

With the rapid development of pipeline construction, pipeline transportation plays an increasingly important role in people's life and industrial production. Due to pipeline wear, sabotage and other factors, pipeline leak events occur from time to time, which cause huge economic losses and resource waste, and even lead to casualties and adverse effects. Thus, real-time monitoring of fluid transportation pipelines is of great significance in timely alarm for pipeline leaks and location of leak points.

At present, the most commonly used method for pipeline leak detection in China is a negative pressure wave detection method. Mostly, pressure sensors are disposed at two ends of a certain pipeline. As the two ends have an obvious pressure drop during pipeline leaks, a leak point can be located based on a time delay of the pressure drop.

Due to a complex structure of a transportation pipeline network, the traditional negative pressure wave leak detection method is not suitable for the pipeline network. By taking an urban water supply pipeline network as an example, a pipeline needs to include a plurality of branches to meet the water demands of a large number of users. The pipeline branches may be increased correspondingly in densely populated areas. In this case, if the traditional negative pressure wave detection method is still used for pipeline leak detection, two ends of each branch should be equipped with the pressure sensors, resulting in high costs and inapplicability. As a result, the number of the pressure sensors for pipeline network leak monitoring is far less than that of the pipeline branches, and there are multiple solutions throughout a particular negative pressure wave propagation path.

Therefore, it is necessary to develop a negative pressure wave monitoring based leak detection method of a multipath pipeline network to solve the above problems.

SUMMARY

The present disclosure provides a negative pressure wave monitoring based leak detection method of a multipath pipeline network. In the present disclosure, leak location of a complex pipeline in an urban can be realized according to the principle of negative pressure wave detection and location. The present disclosure has broader application, and the detailed description is given below:

The negative pressure wave monitoring based leak detection method of the multipath pipeline network is provided, and the method includes the following steps:

analyzing a propagation process of a negative pressure wave in a single straight pipeline to obtain a calculated result of a sound velocity in a thin-walled pipe, the calculated result is used for calculating a negative pressure wave propagation time;

disposing a plurality of pressure sensors at proper positions of the pipeline, and marking the pressure sensors at known disposing positions on a pipeline network map;

linearly interpolating position coordinates of key nodes in the pipeline network to extend pipeline network information; resolving the time that a negative pressure wave signal generated by a leak propagates to each disposed remote treatment units (hereinafter referred to as RTU) in case of the leak at each position in the pipeline network in sequence, to form a data column, and thus establishing a time delay standard library; and simulating a leak situation, detecting a pipeline pressure waveform by using the RTUs in a current network, and after calculating a difference between the measured arrival time of the negative pressure wave at each position and the time delay standard library as a reference, determining a point corresponding to the data column closest to a measured propagation time delay in the time delay standard library as a leak point, and outputting the position of the leak point.

Wherein, the step of linearly interpolating the position coordinates of the key nodes in the pipeline network to extend the pipeline network information specifically includes:

an interpolation interval being $\Delta d$, if $|x_0-x_1| \geq |y_0-y_1|$, generating a vector $J_0$, the vector $J_0$ including all numbers from $x_0$ to $x_1$, substituting elements in the vector $J_0$ into the following formula in sequence to obtain a coordinate sequence $I_0$;

$$y(x) = \frac{x-x_1}{x_0-x_1}y_0 + \frac{x-x_0}{x_1-x_0}y_1$$

if $|x_0-x_1| < |y_0-y_1|$, generating $J_1$ including all numbers from $y_0$ to $y_1$, the interval being $\Delta d$, and substituting elements in the vector $J_1$ into the following formula in sequence to obtain a coordinate sequence $I_1$; and $$x(y) = \frac{y-y_1}{y_0-y_1}x_0 + \frac{y-y_0}{y_1-y_0}x_1$$

acquiring latitude and longitude coordinate values of the point after subdivision according to the one-to-one correspondence of the elements in the coordinate sequence $I_0$ and the coordinate sequence $I_1$.

Furthermore, the step of calculating the difference between the measured arrival time of the negative pressure wave at each position and the time delay standard library, to determine the point corresponding to the data column closest to the measured propagation time delay in the time delay standard library as the leak point, and output the position of the leak point specifically includes:

comparing arrays of the measured time of the RTUs in the current network with corresponding data in the time delay standard library, and calculating a sum of squares of differences in time corresponding to all subdivision points in the time delay standard library, the sum being denoted by $A_i$, i being a serial number of the subdivision point, if min $A_i$ is smaller than a set threshold, outputting all position coordinates meeting $A_i<Th$;

if min $A_i>Th$, considering influence of a systematic error for the measured time, performing overall translation on a plurality of measured time, recalculating min $A_i$ after each translation, a translation values denoted by $\Delta T$, performing traversal search for $\Delta T$ within a certain range, to ensure that min $A_i$ finally calculated after time translation is the minimum; and if min $A_i<Th$ after translation, outputting all position coordinates meeting $A_i<Th$, and denoting the translation values $\Delta T$ at this moment, and if min $A_i>Th$, giving an alarm for prompt.

The method further includes following steps after Step 1) and before Step 2):

disposing pipeline monitoring units in an existing heat exchange station considering actual conditions of a heat-supply pipeline network, to achieve real-time monitoring of a pipeline pulsating pressure signal of a particular disposing position.

Furthermore, the step of disposing the pipeline monitoring units in the existing heat exchange station considering the actual conditions of the heat-supply pipeline network, to achieve real-time monitoring of the pipeline pulsating pressure signal of the particular disposing position specifically includes:

monitoring the pressure signal by using the RTUs, the RTUs having the following technical indexes:

Main frequency of controller: 1 GHz; excitation current: 4 to 20 mA; excitation voltage: 9 to 36 VDC; communication mode: 4G wireless data remote communication; positioning and time service mode: GPS and Beidou dual-mode, synchronizing with NTP; and working temperature: −40° C. to 70° C.;

implementing pipeline data acquisition through substation equipment at the upstream and downstream along the pipeline, and performing transmission by an NTP clock synchronization server over a 4G wireless network; and connecting a current signal of a pressure transmitter station to the RTUs by the substation equipment, the RTUs achieving clock synchronization through an Internet NTP time server and transmitting the acquired signal to a central station server.

Wherein, the substation equipment has the following technical indexes: workstation: Dell Model 5820; processor: Intel Xeon Model W-2012; memory: 8G; hard disk drive: 1 TB; operating system: Windows 10; and disk array: Raid 1.

Furthermore, the whole software design of the method is based on a virtual instrument development platform LabVIEW. Pressure data of each substation equipment is obtained over the Internet by a cloud platform forwarding method, and change in a waveform of a pressure data sequence is detected in real time to record the falling edge time of the negative pressure wave after determining the occurrence of any leak.

Wherein, the method further includes:

augmenting a matrix N in a column direction before interpolation, and splicing the matrix N with an all-zero matrix with the same rows; processing adjacent coordinates column by column during interpolation of a certain pipeline for subdivision, defining an all-zero row vector extend when searching a first coordinate point, temporarily saving the augmented data in a vector extend1 by the end of interpolation of the first pair of adjacent coordinates, splicing the extend1 to the end of the extend, processing the next pair of adjacent coordinate points, and repeating the above operation to finally obtain an intact interpolation data vector extend of this pipeline.

The longitude interpolation and latitude interpolation of the pipeline point position are independent in an interpolation operation process, and latitude and longitude vectors after interpolation are combined.

The technical scheme provided by the present disclosure has the following beneficial effects:

1. According to the present disclosure, a corresponding experimental platform is established according to the principle of negative pressure wave detection, which can monitor an urban water supply pipeline in real time, and realize leak location of a complex pipeline network, with high feasibility; and 2. According to the present disclosure, fewer pressure sensors are used, the application cost is low, and thus, the method can be used for optimizing pipeline maintenance work to avoid casualties and other major safety and environmental protection accidents caused by pipeline leaks.

DETAILED DESCRIPTION OF THE PRESENT DISCLOSURE

To make the objectives, technical schemes and advantages of the present disclosure clearer, the implementations of the present disclosure will be described below in detail.

Embodiment 1

Figure 1:
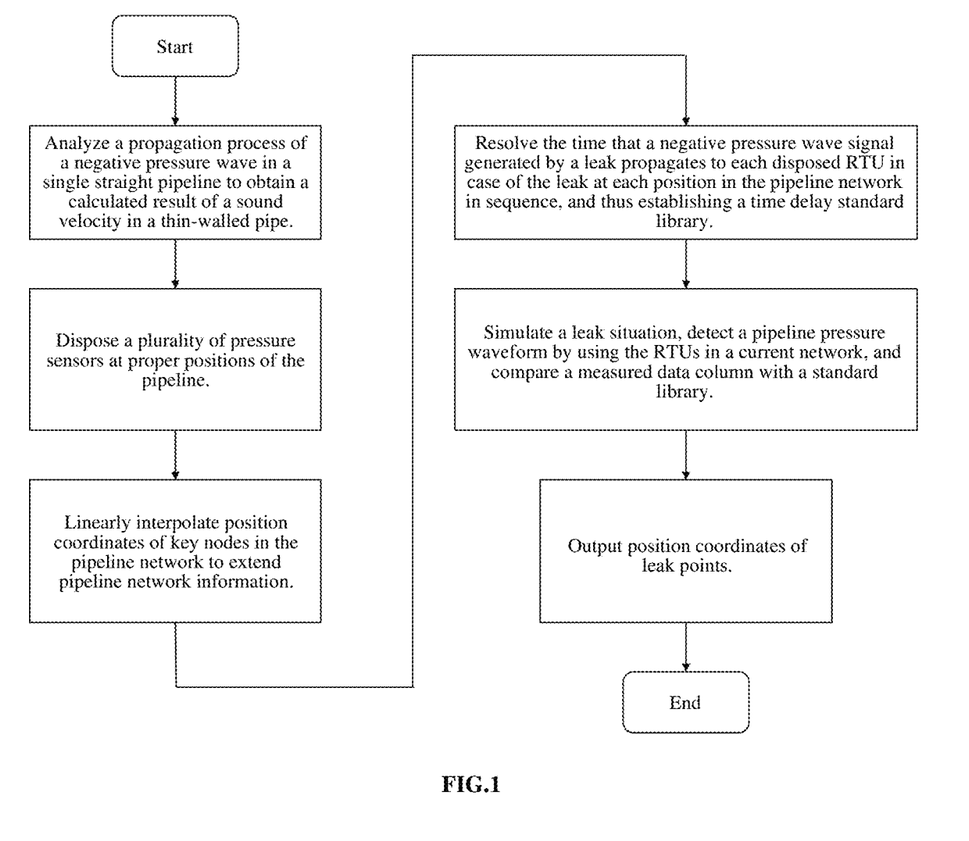
FIG. 1 is a flow chart of a negative pressure wave monitoring based leak detection method of a multipath pipeline network.

A negative pressure wave monitoring based leak detection method of a multipath pipeline network is provided. Referring to FIG. 1, the method includes the following steps:

Step 101: a propagation process of a negative pressure wave in a single straight pipeline was analyzed to obtain a calculated result of a sound velocity in a thin-walled pipe, and the calculated result was used for calculating a negative pressure wave propagation time;

Step 102: pipeline monitoring units were disposed in an existing heat exchange station considering actual conditions of a heat-supply pipeline network, to achieve real-time monitoring of a pipeline pulsating pressure signal of a particular disposing position;

Step 103: pressure sensors (denoted by RTU) at known disposing positions were marked on a pipeline network diagram;

Step 104: position coordinates of key nodes in the pipeline network were linearly interpolated to extend pipeline network information;

Step 105: the time that a negative pressure wave signal generated by a leak propagates to each disposed RTU in case of leak at each position in the pipeline network was resolved in sequence, to form a data column, and thus a time delay standard library was established; and Step 106: a leak situation was simulated, a pipeline pressure waveform was detected by using the RTUs in a current network, and after a difference between the measured arrival time of the negative pressure wave at each position and the time delay standard library as a reference was calculated, a point corresponding to the data column closest to a measured propagation time delay in the time delay standard library was determined as a leak point, and the position of the leak point was output.

In conclusion, the embodiment of the present disclosure can realize leak location of the complex pipeline network by using pressure information of a limited number of sensors through Steps 101-106, and the feasibility of the method is high.

Embodiment 2

The scheme in the embodiment 1 will be further explained below in combination with specific examples and calculation formulas, and the detailed description is given as follows:

Step 201: a propagation model of a negative pressure wave in a single straight pipeline is established;

The method of analyzing a propagation process of the negative pressure wave in the single straight pipeline to obtain a calculated result of a sound velocity in a thin-walled pipe specifically includes the following steps:

$$a = \sqrt{\frac{K/\rho}{1 + \frac{KD}{E\delta}C_1}} \quad (1)$$

Wherein, K is an elastic coefficient of liquid in Pa; $\rho$ is a density of the liquid in kg/m$^3$; $\delta$ is a wall thickness of a pipeline in m; D is an inner diameter of the pipeline in m; E is elastic modulus of a pipe, and is about 2.0×10$^{11}$ Pa for a steel pipe; and $C_1$ is a constraint coefficient of the pipe, which depends on constraint conditions of the pipe.

In this embodiment, main parameters are set as follows: the elastic coefficient K of water: 2.1×10$^9$ Pa; the density $\rho$ of water: 1.0×10$^3$ kg/m$^3$; the wall thickness $\delta$ of the pipeline: 0.05 m; the elastic modulus E of the steel pipe: 2.0×10$^{11}$ Pa; and the constraint coefficient $C_1$ of the pipe: 0.81.

Wherein, the inner diameters D of the pipeline change with different pipe sections.

Step 202: pipeline monitoring units are disposed in an existing heat exchange station considering actual conditions of a heat-supply pipeline network, to achieve real-time monitoring of a pipeline pulsating pressure signal of a particular disposing position.

Figure 2:
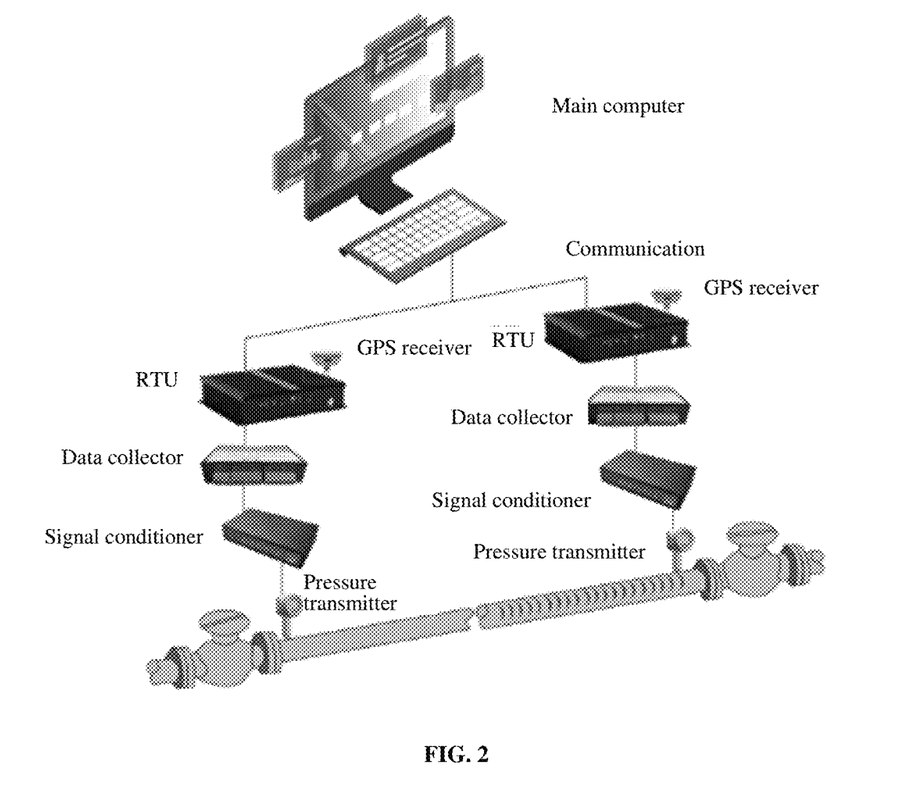
FIG. 2 is a deployment diagram of a pressure monitoring system.

The specific step is: the deployment diagram of the pressure monitoring system used in this scheme is shown in FIG. 2. The pressure signal is monitored by using Remote Terminal Units (RTUs), which can meet the requirements of long communication distances and mass data storage.

In this embodiment, the RTU has the following technical indexes:

(1) Main frequency of a controller: 1 GHz;
(2) Excitation current: 4 to 20 mA;
(3) Excitation voltage: 9 to 36 VDC;
(4) Communication mode: 4G wireless data remote communication;
(5) Location and time service mode: GPS and Beidou dual-mode, synchronizing with NTP; and
(6) Working temperature: −40° C. to 70° C.

Pipeline data acquisition is implemented through data acquisition equipment of substations at the upstream and downstream along the pipeline, transmission is performed through a 4G wireless network, and an NTP clock synchronization server is arranged to ensure time synchronization of equipment at each substation.

The substation equipment will independently complete acquisition and network transmission of inbound and outbound pressure signals of the current substation, the specific way is: a current signal of a pressure transmitter station is connected to the RTUs, the RTUs realize clock synchronization through an Internet NTP time server, and transmit the acquired signal to a central station server on this basis.

In this embodiment, a substation server has the following technical indexes:

(1) Workstation: Dell Model 5820;
(2) Processor: Intel Xeon Model W-2012;
(3) Memory: 8G;
(4) Hard disk drive: 1 TB;
(5) Operating system: Windows 10; and
(6) Disk array: Raid 1.

The whole software design of a pipeline leak detection system is based on a virtual instrumentation development platform LabVIEW. The system acquires pressure data of each substation by a cloud platform forwarding method over the Internet, and detects changes in a waveform of a pressure data sequence in real time to record the falling edge time of the negative pressure wave after determining the occurrence of any leak. A cloud platform interface includes three parts of a monitoring and early warning map, a real-time pressure waveform and a leak time list.

Step 203: pressure sensors (denoted by RTU) at known disposing positions are marked on a pipeline network diagram;

The step specifically includes the following substeps: distribution data of a known pipeline network is processed, a data form is converted into a matrix (blank parts in the form are denoted by NaN), named N. Each row of data of N represents latitude and longitude coordinates of a midpoint or bending point position of a pipeline (which may not be a straight pipe).

An adjacency matrix is established according to the connection relation among different points. Supposing that coordinates of totally n different points are provided, the points are numbered with 1, 2, 3 . . . n, the adjacency matrix C has n rows and n columns in total; let an element at the i th row and the j th column in the adjacency matrix be $c_{ij}$, when a point i is connected with a point j, $c_{ij}$ is 1, or else it is 0.

Pipeline network mapping in matlab can be achieved according to the coordinates of point positions in the pipeline network and the adjacency matrix C (using gplot commands) As the longitude and latitude of each pressure sensor are known, markings can be made directly on a pipeline network map.

Figure 3:
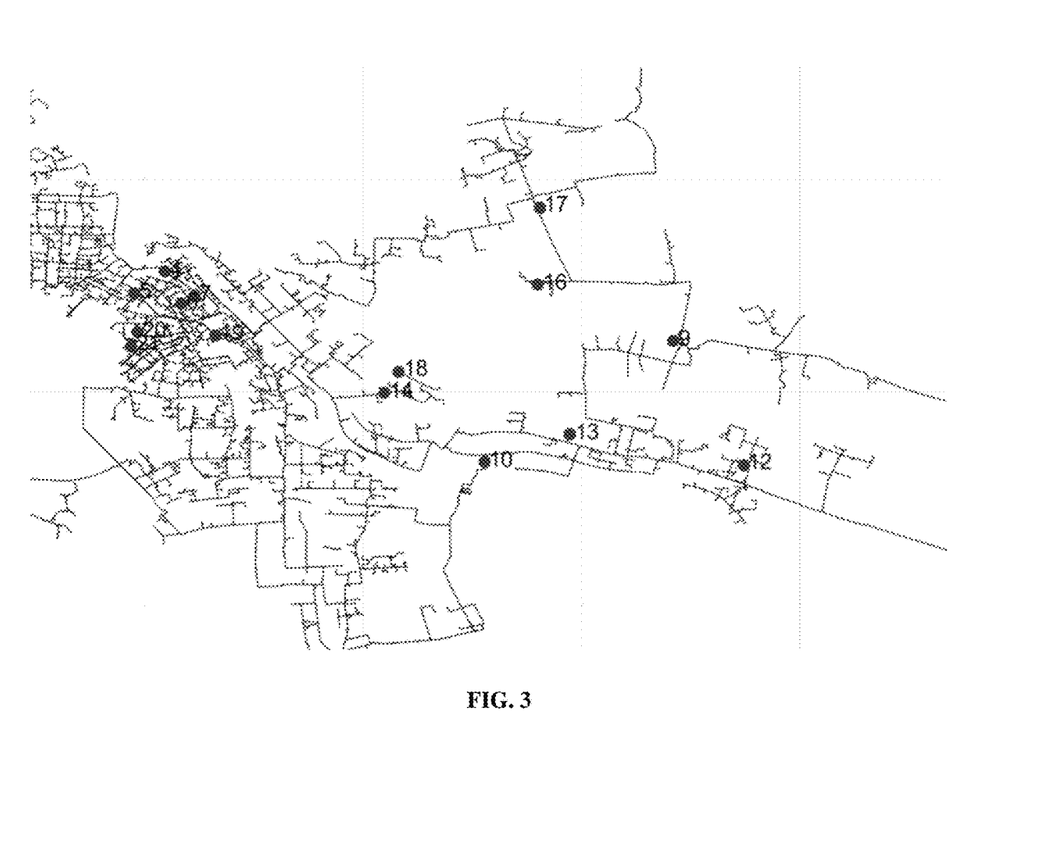
FIG. 3 is a distribution diagram of an urban pipeline network and sensors.

In this embodiment, an actual pipeline network map and sensor distribution are shown in FIG. 3, and a plurality of pressure sensors are disposed separately (marked by dots on the map, and figures represent the number of the sensors).

A left area in FIG. 3 shows densely arranged pipelines, 7 sensors are disposed in total, and a straight line distance between the adjacent sensors ranges from 300 meters to 1000 meters; and the rest areas show sparsely arranged pipelines, and the straight line distance between the disposed adjacent sensors is more than 2000 meters.

Figure 4:
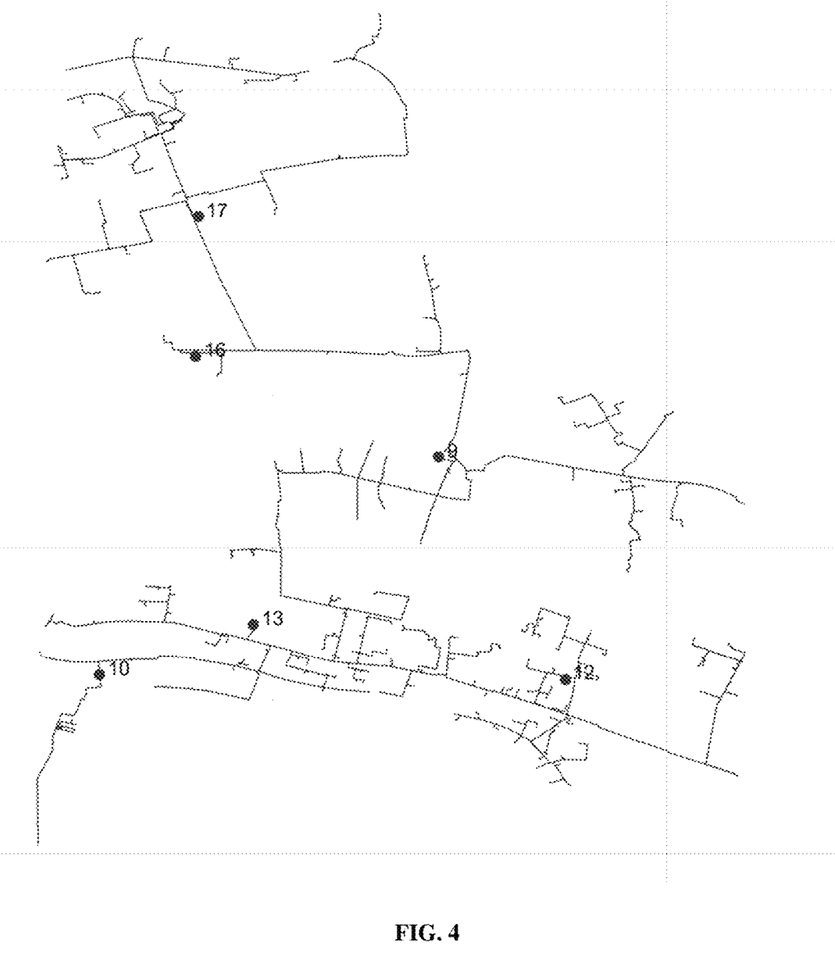
FIG. 4 is a designated area chart.

In this embodiment, in order to reduce computations, only a certain area of the pipeline network is intercepted as a zone where leak may occur, the designated area is shown in FIG. 4, and located at the right zone of the area in FIG. 3.

Screening of pipeline data in specific areas is achieved through traversal, a longitude upper limit (denoted by xmax), a longitude lower limit (denoted by xmin), a latitude upper limit (denoted by ymax) and a latitude lower limit (denoted by ymin) are defined firstly, and then data in a pipeline form is searched row by row and column by column; and if coordinates (a, b) of a certain position at least meet one of the following conditions, the coordinate data will be deleted:

$$a < xmin; \quad (1)$$

$$a > xmax; \quad (2)$$

$$b < ymin; \text{ and} \quad (3)$$

$$b > ymax. \quad (4)$$

Inner diameter data of all pipelines is saved in a column vector, and denoted by dia before data screening. After some coordinates are deleted in the above steps, the data of the line where a part of pipeline is located is null, and as a result an element at the corresponding position in dia needs to be deleted.

In another aspect, the pressure sensors of selected areas need to be screened, the specific implementation is similar to a data screening process of pipeline positions, that is, traversal is conducted on coordinates of all disposed sensors; and if the coordinates are beyond the upper limit (or the lower limit) of the designated area, the data of the sensor will be deleted.

After a program operates initially, the adjacency matrix C, the screened area and a subdivided data matrix and screened sensor coordinates are saved in a file, the above data can be directly recalled when the program operates again to resolve the time delay standard library, and the repeated calculation time is saved.

Figure 5:
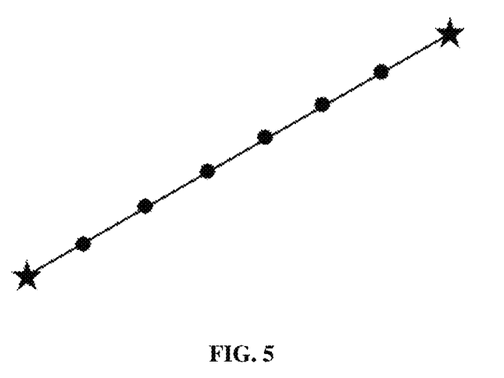
FIG. 5 is a schematic diagram of linear interpolation.

Step 204: position coordinates of key nodes in the pipeline network are linearly interpolated to extend pipeline network information;

The specific step is: the pipeline formed between any two adjacent points obtained in Step 203 is taken as a straight pipe section, linear interpolation can be conducted on longitudes and latitudes of any two adjacent points to obtain new coordinates of a plurality of pipe sections, and achieve subdivision of the entire pipeline network into a plurality of discrete points. A schematic diagram of interpolation is shown in FIG. 5, asteroid points are interpolated points, and dots are linear interpolation results.

Let the latitude and longitude coordinates of two adjacent points be $(x_0, y_0)$ and $(x_1, y_1)$, two expression forms of a linear interpolation formula are:

$$y(x) = \frac{x - x_1}{x_0 - x_1} y_0 + \frac{x - x_0}{x_1 - x_0} y_1 \quad (2)$$

$$x(y) = \frac{y - y_1}{y_0 - y_1} x_0 + \frac{y - y_0}{y_1 - y_0} x_1 \quad (3)$$

Let the interpolation interval be $\Delta d$, if $|x_0 - x_1| \geq |y_0 - y_1|$, a vector $J_0$ is generated. The vector $J_0$ includes all numbers from $x_0$ to $x_1$, and the interval is $\Delta d$. The elements in the vector $J_0$ are substituted into the formula (2) in sequence to obtain a coordinate sequence $I_0$.

Similarly, if $|x_0 - x_1| < |y_0 - y_1|$, a vector $J_1$ is generated, and includes all numbers from $y_0$ to $y_1$, and the interval is $\Delta d$. The elements in the vector $J_1$ are substituted into the formula (3) in sequence to obtain a coordinate sequence $I_1$.

Latitude and longitude coordinate values of the point after subdivision are acquired according to the one-to-one correspondence of the elements in the coordinate sequence $I_0$ and the coordinate sequence $I_1$.

If $x_0 = x_1$ and $y_0 = y_1$, interpolation subdivision is not conducted.

For example, coordinates of existing two adjacent points are (117.33601° E, 39.08675° N) and (117.33616° E, 39.08670° N), linear interpolation is conducted on the two points, and $\Delta d$ is 0.00001; as |117.33601−117.33616|=0.00015>|39.08675−39.08670|=0.00005, the vector $J_1$ is a vector including 16 elements of 117.33601, 117.33602, 117.33603 . . . 117.33616, these values are substitute into the formula (3) to obtain a coordinate sequence $I_1$, namely the coordinates with 16 subdivision points.

A special case is described below. If the interpolated coordinates remain unchanged, and are still (117.33601° E, 39.08675° N) and (117.33616° E, 39.08670° N), but $\Delta d$ is changed to 0.00006, it can be found that equal interval interpolation of 2 points cannot be met; in order to ensure that the raw data is not lost, $x_0$ is still taken as a starting point at the moment, $\Delta d$ is an interval, the vector $J_1$ is generated firstly, but it is ensured that the elements in the vector $J_1$ are not beyond the range of $x_0$ and $x_1$. After completion of interpolating calculation, coordinates of endpoints are supplemented. In this example, $J_1$ is a vector including 3 elements of 117.33601, 117.33607 and 117.33614, the 3 values are substituted into the formula (3) to obtain the coordinate sequence $I_1$, namely that latitude and longitude coordinates of 3 subdivision points are provided, and the endpoint (117.33616° E, 39.08670° N) is supplemented. The interpolation subdivision this time is completed.

As the interpolation subdivision causes a large increase in pipeline data, which even exceeds the range of the existing data matrix N, so the matrix N needs to be augmented in a column direction before interpolation, to ensure that the data does not overflow. The specific implementation is: the matrix N and an all-zero matrix with the same rows are spliced. The total number of columns in the spliced matrix in the embodiment is 5000, and this number can be adjusted according to the coordinate complexity of an actual pipeline network. During subdivision, $\Delta d$ is 0.00005 (the interval among the subdivision points after interpolation is about 5 meters).

Adjacent coordinates need to be processed column by column during interpolation subdivision of a certain pipeline, an all-zero row vector extend is defined when a first coordinate point is searched, the augmented data is temporarily saved in a vector extend1 by the end of interpolation of the first pair of adjacent coordinates, the extend1 is spliced to the end of the extend, the next pair of adjacent coordinate points is processed, and the above operation is repeated to finally obtain an intact interpolation data vector extend of this pipeline.

The longitude interpolation and latitude interpolation of the pipeline point position are independent in an interpolation operation process, and latitude and longitude vectors after interpolation need to be combined in order to finally obtain a data format consistent with the raw data form (namely the longitude and latitude are arrayed in sequence).

Step 205: the time that a negative pressure wave signal generated by a leak propagates to each disposed RTU in case of the leak at each position in the pipeline network is resolved in sequence, to form a data column, and thus a time delay standard library is established;

The specific steps are:

Step 5.1.1, the pipeline network is subdivided into a plurality of discrete points, and a much larger adjacency matrix is reestablished according to the connection relation among the points; and Step 5.1.2, the shortest path from each discrete point to each disposed sensor is resolved by means of a new adjacency matrix.

Step 5.2, a line of connecting every two adjacent points in the shortest path resolved in Step 5.1.2 is taken as a straight pipe section, a length of the pipe section and a wave velocity calculated by the model in Step 201 are directly used as quotient, and then the propagation time of the corresponding negative pressure wave can be calculated (the elastic coefficient, constraint coefficient and other parameters of all pipe sections are identical in calculation, and only the inner diameters of the pipeline are different); and the propagation time of a plurality of sections is added up, and then the arrival time of negative pressure wave signals detected by each pressure sensor can be calculated to form a time delay standard library.

As there are lots of subdivision points, and a single path distance to be calculated is long for a marginal sensor, in order to reduce program operation time, a matlab parallel computing method is used for solving. Considering that host power failure and other cases may occur in calculation, resolved results are saved in a file in a txt format immediately after the arrival time of every 100 groups of negative pressure wave signals is resolved;

In another aspect, influence of elbows and multi-way positions on negative pressure wave propagation needs to be taken into consideration, which can be converted into an increase in propagation time.

An equivalent length can be used for calculating resistance of fluid flowing through a pipe fitting. In hydraulic calculation of a water supply pipeline network system, local resistance is converted into an equivalent length corresponding to frictional resistance along the pipe section with the same pipe diameter, and the corresponding wave propagation time can be calculated.

The equivalent relation is:

$$L_d = (\xi/\lambda) D_i \quad (5)$$

Where, $L_d$ is an equivalent length of the pipe fitting, $D_i$ is an inner diameter of the pipeline, $\lambda$ is a frictional resistance coefficient, a medium flow rate is generally larger than 0.5 m/s in a heat-supply water pipeline in a turbulent state, and $\lambda$ can be calculated by the following formula:

$$\lambda = 0.11(D_i/0.2)^{0.25} \quad (6)$$

Figure 6:
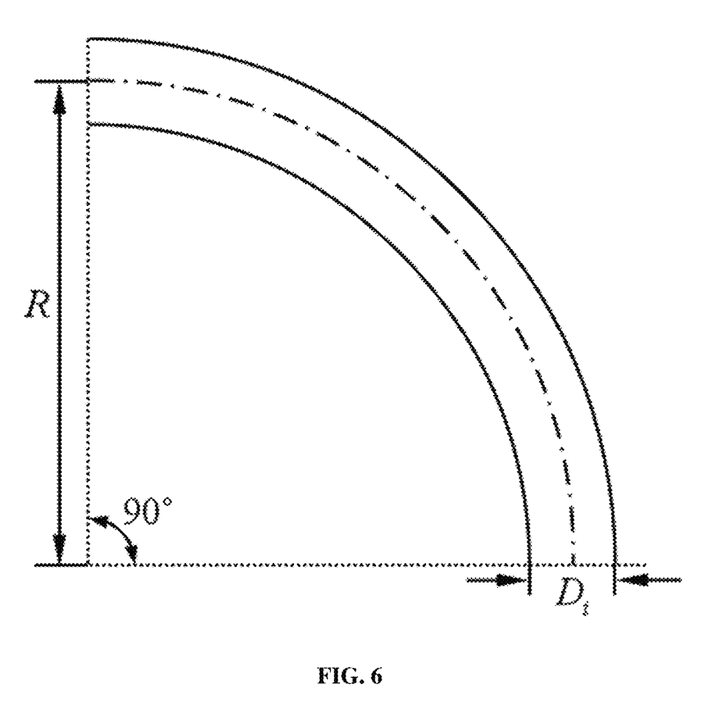
FIG. 6 is a schematic diagram of a 90-degree elbow pipe.
Figure 7:
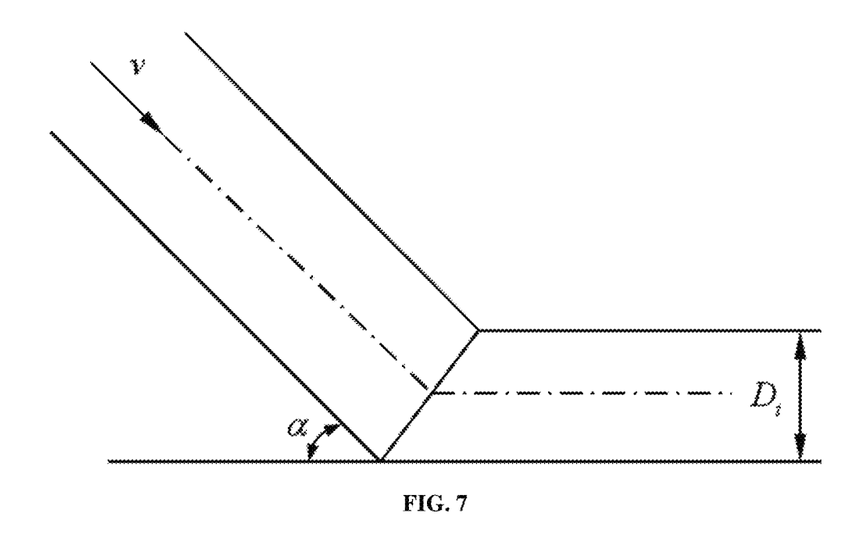
FIG. 7 is a schematic diagram of a sharp bend pipe.

Where, $\xi$ is a local loss coefficient, and related to a geometry of the pipe fitting, for example, for a three-way pipe, $\xi=1.5$; for a 90-degree elbow pipe shown in FIG. 6, let a bending radius of the elbow pipe be R, the relation between $\xi$ and $$\frac{R}{D_i}$$

is shown in Table 1; and for a sharp bend pipe shown in FIG. 7, let a deflection angle of the pipeline be $$\alpha (0 < \alpha < \frac{\pi}{2}),$$

and the relation between $\xi$ and $\alpha$ is shown in Table 2.

TABLE 1

| Local loss coefficient of 90-degree elbow pipe | | | | | | | |
|---|---|---|---|---|---|---|---|
| $\frac{R}{D_i}$ | 0.5 | 1.0 | 1.5 | 2.0 | 3.0 | 4.0 | 5.0 |
| $\xi$ | 1.20 | 0.80 | 0.60 | 0.48 | 0.36 | 0.30 | 0.29 |

TABLE 2

| Local loss coefficient of sharp bend pipe | | | | | | | |
|---|---|---|---|---|---|---|---|
| $\alpha$ | 30° | 40° | 50° | 60° | 70° | 80° | 90° |
| $\zeta$ | 0.20 | 0.30 | 0.40 | 0.55 | 0.70 | 0.90 | 1.10 |

The propagation time of the negative pressure wave at special pipe fittings in FIG. 6 and FIG. 7 can be calculated according to the above formula.

In this embodiment, in order to validate effectiveness of the algorithm, the method of simulating pipeline leaks by manual discharge of water is adopted, and a point is selected on the pipeline in the area of FIG. 5 to discharge water.

Step 206: a leak situation is simulated, a pipeline pressure waveform is detected by using the RTUs in a current network, and after a difference between the measured arrival time of the negative pressure wave at each position and the time delay standard library as a reference is calculated, a point corresponding to the data column closest to a measured propagation time delay in the time delay standard library is determined as a leak point, and the position of the leak point is output;

The specific step is: the input time (namely the measured time in the RTU in the current network) array and data in the time delay standard library are compared one by one, a sum of squares of differences in time corresponding to each subdivision point in the time delay standard library is calculated, and denoted by $A_i$ and i is a serial number of the subdivision point. If min $A_i$ is smaller than a set threshold (denoted by Th), all position coordinates with $A_i$<Th are output.

If min $A_i$>Th, in view of possible influence of the systematic error of the measured time, the program may perform overall translation on some measured time. min $A_i$ will be recalculated after each translation. A translation value is denoted by $\Delta T$, the program may perform traversal search for translation value $\Delta T$ within a certain range, to ensure that min $A_i$ calculated finally after time translation is the minimum value. If min $A_i$<Th after translation, all position coordinates with $A_i$<Th and the translation value $\Delta T$ at the moment are output, if min $A_i$ is still larger than Th, it shows that a deviation of the measured data is large, and the program will send an alarm for prompt.

For example, if the input time totally includes 6 data which are 10.2, 8.6, 5.3, 11.1 and 14.3 respectively (unit: second), the time delay standard library totally includes 651 points, and part of data is shown in Table 3; let Th be 11.72, $A_i=(10.2-9.2710)^2+(8.6-6.7073)^2+(5.3-2.7851)^2+(5.5-5.3000)^2+(11.1-12.9453)^2+(14.3-13.9858)=15.9052$, $A_1, A_2 \ldots A_{651}$ is calculated in sequence, the minimum sum of squares of the final difference is 11.6755, and obtained at the 330th discrete point, and translation of the input time is not required.

If letting Th be 11.67 at the moment, obviously min $A_i$>Th, a comparison program is operated again, traversal search is conducted on the translation value ΔT between −15 and 15, to finally obtain the result that when the translation value ΔT is −1, namely the input time translation values are 9.2, 7.6, 4.3, 4.5, 10.1 and 13.3, min $A_i$ is the minimum, and is obtained at the 129th discrete point, which is 11.6407.

TABLE 3

Time delay standard library (partial)

| Serial number of discrete point | Sensor 1 | Sensor 2 | Sensor 3 | Sensor 4 | Sensor 5 | Sensor 6 |
|---|---|---|---|---|---|---|
| 1 | 9.2710 | 6.7073 | 2.7851 | 5.3000 | 12.9453 | 13.9858 |
| 2 | 9.2741 | 6.7104 | 2.7882 | 5.3032 | 12.9484 | 13.9890 |
| 3 | 9.2773 | 6.7136 | 2.7914 | 5.3063 | 12.9516 | 13.9921 |
| 4 | 9.2804 | 6.7168 | 2.7946 | 5.3095 | 12.9547 | 13.9953 |
| 5 | 9.2836 | 6.7199 | 2.7977 | 5.3126 | 12.9579 | 13.9984 |
| 6 | 9.2867 | 6.7231 | 2.8009 | 5.3158 | 12.9610 | 14.0016 |
| 7 | 9.2867 | 6.7231 | 2.8009 | 5.3158 | 12.9610 | 14.0016 |
| 8 | 9.2867 | 6.7231 | 2.8009 | 5.3158 | 12.9610 | 14.0016 |

In the embodiments, the latitude and longitude coordinates of an actual water leak point are (117.29760° E, 39.09885° N), and a comparison test is conducted on this set of measured time. At the moment, let Th be 0.08, the measured time is compared with the time delay standard library, coordinates of 25 suspicious leak positions are obtained finally, and the time translation value ΔT is −12. The corresponding location errors are calculated from 0 m to 200 m, and output results are shown in Table 4. It can be seen that the actual water discharge point is within predicted results.

TABLE 4

Predicted position results

| Predicated longitude | Predicated latitude | Location error (meter) |
|---|---|---|
| 117.29744 | 39.09911 | 32.16746 |
| 117.29743 | 39.09906 | 27.49072 |
| 117.29743 | 39.09904 | 25.72078 |
| 117.29743 | 39.09904 | 25.72078 |
| 117.29748 | 39.09903 | 22.94305 |
| 117.29753 | 39.09903 | 20.71947 |
| 117.29758 | 39.09902 | 19.242 |
| 117.2976 | 39.09902 | 18.90314 |
| 117.2976 | 39.09902 | 18.90314 |
| 117.2976 | 39.09897 | 13.34339 |
| 117.2976 | 39.09892 | 7.78364 |
| 117.2976 | 39.09887 | 2.2239 |
| 117.2976 | 39.09885 | 0 |
| 117.296 | 39.09975 | 170.38771 |
| 117.29595 | 39.09975 | 173.74483 |
| 117.2959 | 39.09974 | 177.14322 |
| 117.29585 | 39.09974 | 180.58178 |
| 117.2958 | 39.09974 | 184.05707 |
| 117.29575 | 39.09974 | 187.56763 |
| 117.2957 | 39.09973 | 191.11208 |

TABLE 4-continued

Predicted position results

| Predicated longitude | Predicated latitude | Location error (meter) |
|---|---|---|
| 117.29565 | 39.09973 | 194.68746 |
| 117.2956 | 39.09973 | 198.29318 |
| 117.29555 | 39.09973 | 201.92655 |
| 117.2955 | 39.09972 | 205.58716 |
| 117.29545 | 39.09972 | 209.27255 |

In conclusion, the negative pressure wave monitoring based leak detection method of the multipath pipeline network provided by the embodiment of the present disclosure can realize leak detection and location of the multipath pipeline network.

Those skilled in the art can understand that a drawing is only a schematic diagram of a preferred embodiment. The serial number of the above embodiments of the present disclosure is only for description, and does not represent the advantages and disadvantages of the embodiments.

The above descriptions are merely preferred embodiments of the present disclosure, which are not intended to limit the present disclosure. Any modification, equivalent replacement and improvement made within the spirit and principle of the present disclosure should fall within the scope of protection of the present disclosure.

The invention claimed is:

1. A negative pressure wave monitoring based leak detection method of a multipath pipeline network, wherein the method includes following steps:

Step 1): analyzing a propagation velocity of a negative pressure wave in a single straight pipeline to obtain a calculated result of a sound velocity in a thin-walled pipe, the propagation velocity is calculated as below:

$$a = \sqrt{\frac{K/\rho}{1+\frac{KD}{E\delta}C_1}}, \quad (1)$$

wherein, a is the propagation velocity, K is an elastic coefficient of liquid in Pa; ρ is a density of the liquid in kg/m3; δ is a wall thickness of a pipeline in m; D is an inner diameter of the pipeline in m; E is elastic modulus of a pipe, and is about 2.0×1011 Pa for a steel pipe; and C1 is a constraint coefficient of the pipe, which depends on constraint conditions of the pipe, and wherein the calculated result is used for calculating a negative pressure wave propagation time;

Step 2): disposing a plurality of pressure sensors at positions of the pipeline, and marking the pressure sensors at known disposing positions on a pipeline network map;

Step 3): linearly interpolating position coordinates of nodes in the pipeline network to extend pipeline network information; resolving the time that a negative pressure wave signal generated by a leak propagates to each remote treatment units (RTUs) at each position in the pipeline network in sequence, to form a data column, and thus establishing a time delay standard library; and Step 4): simulating a leak situation, detecting a pipeline pressure waveform by using the RTUs in a current network, and after calculating a difference between the measured arrival time of the negative pressure wave at each position and the time delay standard library as a reference, determining a point corresponding to the data column closest to a measured propagation time delay in the time delay standard library as a leak point, and outputting the position of the leak point.

2. The negative pressure wave monitoring based leak detection method of a multipath pipeline network according to claim 1, wherein, the step of calculating the difference between the measured arrival time of the negative pressure wave at each position and the time delay standard library, to determine the point corresponding to the data column closest to the measured propagation time delay in the time delay standard library as the leak point, and output the position of the leak point specifically includes:

comparing arrays of the measured time of the RTUs in the current network with corresponding data in the time delay standard library, and calculating a sum of squares of differences in time corresponding to all subdivision points in the time delay standard library, the sum being denoted by $A_i$, i being a serial number of the subdivision point, if min $A_i$ is smaller than a set threshold, outputting all position coordinates meeting $A_i$<Th;

if min A; >Th, considering influence of a systematic error for the measured time, performing overall translation on a plurality of measured time, recalculating min A after each translation, a translation value denoted by ΔT, performing traversal search for the translation values ΔT within a certain range, to ensure that min $A_i$ finally calculated after time translation is the minimum value; and if min $A_i$<Th after translation, outputting all position coordinates meeting $A_i$<Th, and denoting the translation values ΔT at this moment, and if min $A_i$>Th, giving an alarm for prompt.

3. The negative pressure wave monitoring based leak detection method of a multipath pipeline network according to claim 1, wherein, the method further includes following steps after the Step 1) and before the Step 2):

disposing pipeline monitoring units in an existing heat exchange station considering actual conditions of a heat-supply pipeline network, to achieve real-time monitoring of a pipeline pulsating pressure signal of a particular disposing position.

4. The negative pressure wave monitoring based leak detection method of a multipath pipeline network according to claim 3, wherein, the step of disposing the pipeline monitoring units in the existing heat exchange station considering actual conditions of the heat-supply pipeline network, to achieve real-time monitoring of the pipeline pulsating pressure signal of the particular disposing position specifically includes:

monitoring the pressure signal by using the RTUs, the RTUs having the following technical indexes:

main frequency of controller: 1 GHz; excitation current: 4 to 20 mA; excitation voltage: 9 to 36 VDC; communication mode: 4G wireless data remote communication; positioning and time service mode: GPS and Beidou dual-mode, synchronizing with NTP; and working temperature:−40° C. to 70° C.;

implementing pipeline data acquisition through substation equipment at the upstream and downstream along the pipeline, and performing transmission by an NTP clock synchronization server over a 4G wireless network; and connecting a current signal of a pressure transmitter station to the RTUs by the substation equipment, the RTUs achieving clock synchronization through an Internet NTP time server and transmitting the acquired signal to a central station server.

5. The negative pressure wave monitoring based leak detection method of a multipath pipeline network according to claim 4, wherein the substation equipment has the following technical indexes: workstation: Dell Model 5820; processor: Intel Xeon Model W-2012; memory: 8G; hard disk drive: 1 TB; operating system: Windows 10; and disk array: Raid 1.

6. The negative pressure wave monitoring based leak detection method of a multipath pipeline network according to claim 5, wherein, the whole software design of the method is based on a virtual instrument development platform, pressure data of each substation equipment is obtained over the Internet by a cloud platform forwarding method, and change in a waveform of a pressure data sequence is detected in real time to record the falling edge time of the negative pressure wave after determining the occurrence of any leak.

* * * * *